United States Patent [19]

Stephens

[11] Patent Number: 4,671,841
[45] Date of Patent: Jun. 9, 1987

[54] METHOD OF MAKING AN ACOUSTIC PANEL WITH A TRIAXIAL OPEN-WEAVE FACE SHEET

[75] Inventor: Gerald E. Stephens, Anaheim, Calif.

[73] Assignee: Rohr Industries, Inc., Chula Vista, Calif.

[21] Appl. No.: 816,359

[22] Filed: Jan. 6, 1986

[51] Int. Cl.$^4$ .................. B32B 31/12; E04B 1/74; E04B 1/82
[52] U.S. Cl. ................... 156/292; 156/313; 181/292; 181/294; 428/116
[58] Field of Search .............. 181/286, 292, 294; 428/408, 116, 255, 257; 156/313, 292, 197

[56] References Cited

U.S. PATENT DOCUMENTS

| | | | |
|---|---|---|---|
| Re. 28,155 | 9/1974 | Dow | 139/383 R |
| 3,914,494 | 10/1975 | Park | 428/408 |
| 4,020,209 | 4/1977 | Yuan | 139/383 R |
| 4,433,021 | 2/1984 | Riel | 428/116 |
| 4,438,173 | 3/1984 | Trost | 428/408 |

Primary Examiner—Donald E. Czaja
Assistant Examiner—J. Davis
Attorney, Agent, or Firm—Patrick J. Schlesinger; Frank D. Gilliam

[57] ABSTRACT

A method of producing an open, triaxial woven, acoustic face sheet useful in acoustic energy absorbing panels for aircraft engines or the like. The composite face sheet is formed from carbon fibers in an epoxy resin matrix and has about 25 to 33% open area. This face sheet has lower weight and superior and more uniform strength and stiffness than biaxial composite face sheets. The face sheet is made by first weaving carbon fiber tows at warp angles of +30° and −30° and a fill angle of 90°. The woven sheet is impregnated with epoxy as other resins in a manner which produces no rich or starved areas and no blocked openings. The resulting prepreg material may be stored for extended periods at reduced temperatures. The prepreg material is shaped on a suitable mold surface and the resin is fully cured, preferably in a vacuum bag assembly in an autoclave. The resulting sheet has very light weight, an excellent percentage of openings and high strength and stiffness. The sheet may be incorporated in an acoustic energy absorbing structure wherein the sheet has bonded to its outer surface a smooth microporous sheet such as a stainless steel woven wire cloth.

4 Claims, 4 Drawing Figures

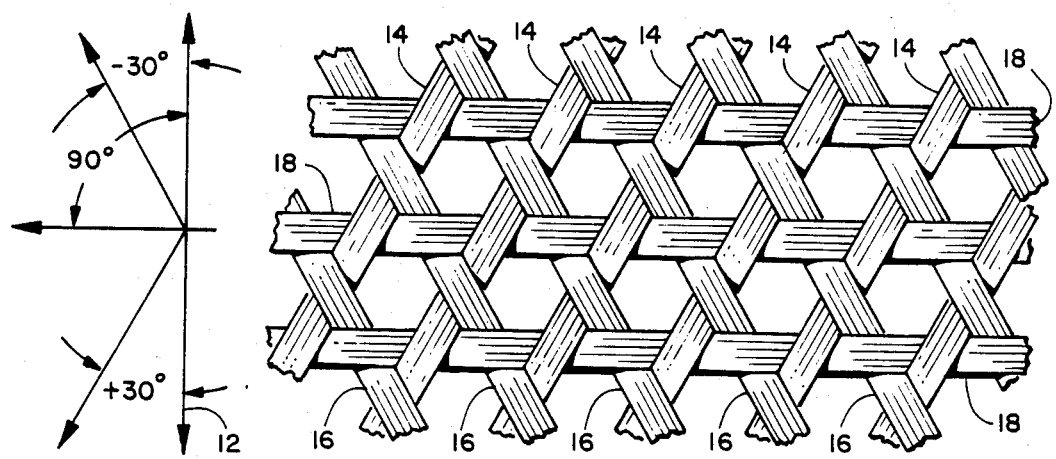
FIGURE 1A
FIGURE 1
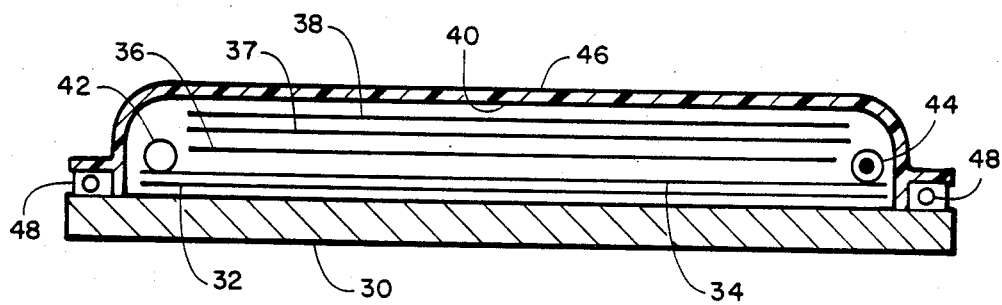
FIGURE 2
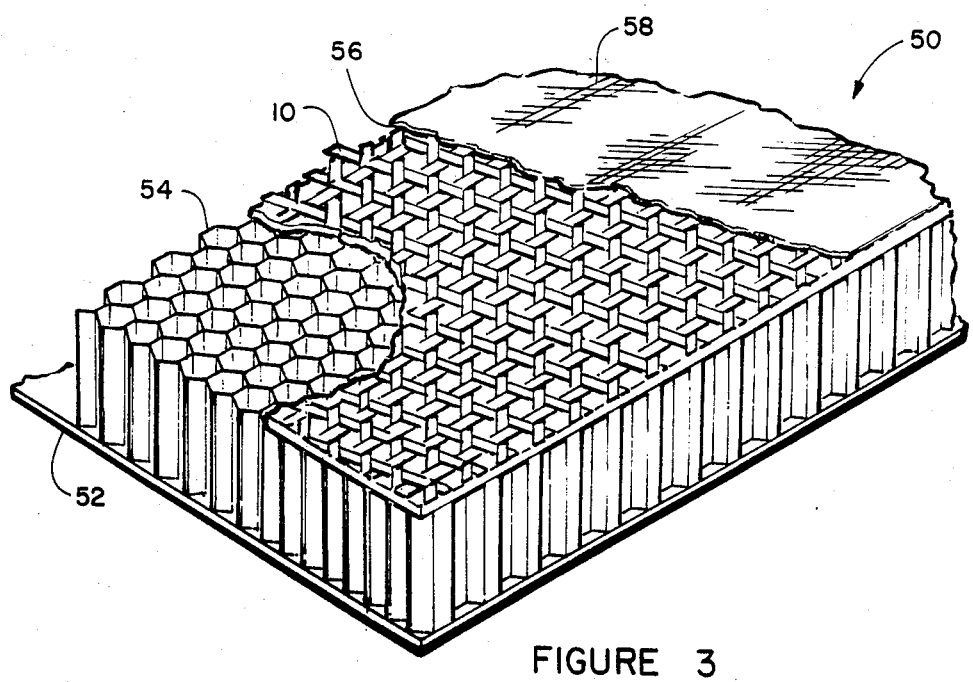
FIGURE 3

METHOD OF MAKING AN ACOUSTIC PANEL WITH A TRIAXIAL OPEN-WEAVE FACE SHEET

BACKGROUND OF THE INVENTION

This invention relates in general to acoustic energy absorbing structures and, more specifically, to an improved acoustic face sheet for such structures and methods of making the face sheet.

A number of different sound absorbing structures have been used as linings in ducts such as aircraft gas turbine engine housings to attenuate the noise generated by the engine. Typically, the sound absorbing structure may be a panel having an imperforate metal baking sheet to which is bonded a honeycomb structure with the honeycomb cells perpendicular to the backing sheet and having a perforated metal face sheet bonded to the opposite honeycomb face. As sonic energy generated by the engine impinges on the perforated sheet, it passes through the perforations and is captured in the honeycomb structure. Such structures are described, for example, in U.S. Pat. Nos. 3,493,774, 3,821,999 and 3,948,346. While these structures are relatively effective, they are also heavy. Typically, the perforated metal plate is aluminum weighing at least 1100 g/m$^2$ in order to provide the necessary strength.

A considerable number of patents have issued describing face sheets made up of composite materials. For example, U.S. Pat. No. 4,112,164 describes an acoustic panel using a face sheet made from glass fibers in an epoxy resin matrix. While this is a very effective panel, the strength and weight of the glass fiber/epoxy face sheet are not optimum. U.S. Pat. No. 3,767,499 describes another method of making a face sheet in which ribbon-like bands of parallel fibers are laid down in a spaced relationship at angles of 0°, 90°, +45° and −45°, with the band spacing selected to provide apertures of desired sizes through the sheet. This multi-layer structure, however, has greater than desired thickness and weight. Another multi-layer fabric composite face sheet is described in U.S. Pat. No. 3,502,171. Here, at least two sheets of biaxially woven fabrics are impregnated with resin and are superimposed with threads out of registry to provide apertures of selected sizes through the sheet. Again, this face sheet has greater thickness and weight than is desirable.

A lattice-type structure of resin impregnated carbon fiber bands is proposed in U.S. Pat. No. 4,092,453. While this structure has high strength and light weight, it is unsuitable for use as an acoustic panel face sheet because of the excessive thickness produced by this method.

Acoustic panel face sheets made from resin impregnated carbon fibers are described in U.S. Pat. Nos. 3,914,494 and 4,390,584. These patents teach weaving carbon fiber tapes in a biaxial manner to produce square or other quadrangular openings in the sheet. One or more layers of the biaxially woven fabric may be used These sheets have an excellent combination of light weight and high strength. However, the strength is concentrated in only two directions, along the warp and weft. These biaxial fabrics are sometimes difficult to shape to complex contours and may, where two or more layers are used, have undesirable thickness.

Thus, despite the significant contributions of a large number of inventors, there is still room for improvement in acoustic panel face sheets having an ideal combination of low weight, high and uniform strength, low thickness and superior formability.

SUMMARY OF THE INVENTION

The above-noted problems, and others, are overcome by the acoustic panel face sheet fabrication method of this invention and the face sheet and acoustic panel made thereby. Basically, the method comprises weaving a triaxial, open weave fabric from carbon fiber, tows with warp angles of about −30° and +30° and a fill angle of about 90°, impregnating the fibers with an epoxy resin, shaping the fabric to the desired configuration on a mold surface and curing the resin.

The resulting face sheet has a smooth outer surface, is thin and light weight, has high and substantially isotropic strength (with the three sets of fiber strands running at about 60° to each other) and has excellent formability for complex surfaces. The face sheet may be bonded to a suitable honeycomb structure having an imperforate backing sheet to provide a relatively high percent of open area. A microporous layer such as stainless steel wire cloth is adhesively bonded to the outer surface of the subject face sheet to provide a superior acoustic panel.

BRIEF DESCRIPTION OF THE DRAWINGS

Details of the invention and of certain preferred embodiments thereof will be further understood upon reference to the drawing, wherein:

FIG. 1 is a plan view of an acoustic panel face sheet embodying this invention;

FIG. 1A is a diagram illustrating the axis, warp and fill lines of the sheet of FIG. 1.

FIG. 2 is a schematic section through a simplified representation of a vacuum bag assembly for curing the face sheet; and FIG. 3 is a schematic perspective view, partially cut-away, illustrating an improved acoustic panel using the face sheet of FIG. 1.

DETAILED DESCRIPTION OF THE INVENTION

Referring now to FIG. 1, there is seen a portion 10 of a triaxial carbon fiber fabric suitable for use as the face sheet of this invention. The length of the fabric as woven is vertical in FIG. 1, as indicated by axis line 12 (FIG. 1A) running at 0°. Warp tows 14 and 16 run at about +30° and −30°, respectively. Fill two 18 runs at about 90°. For best results, each of these angles should be kept within a tolerance of about plus or minus 3°.

The triaxial fabric may be woven in any conventional manner using any conventional weaving machine capable of handling the carbon fiber material. Typical methods of weaving triaxial fabrics are disclosed in U.S. Pat. Nos. 1,368,215, 3,446,251, Re. 28,155 and 3,874,422, which are incorporated herein by reference.

Any suitable carbon fibers may be used for tows 14, 16 and 18. Preferably the Young's modulus of the fiber is in the range of about 30 to 37 × 10$^6$ psi. The number of fiber strands in each tow may be from about 3,000 to 15,000 with the preferred number being 12,000. In general, it is preferred that the warp tows range from about 4.4 to 4.8 per inch and the fill tows ranged from about 4.6 to 5.0 per inch, giving a fabric weight of about 470 to 500 g/m$^2$. While the fabric may have any suitable percentage of open area, best results are obtained with about 25 to 33% open area. These fabrics are useful at temperatures ranging from about −60° to 300° F.

The fabric may be impregnated with a suitable epoxy resin to produce a prepreg. Preferably, the resin will have the following characteristics: low flow, cure without volatile release, good adhesion to graphite fibers, good elevated temperature (300° F.) resistance and good durability in service.

Typical methods of impregnating triaxial fabrics are described in U.S. Pat. Nos. 4,010,306 and 4,020,209. A horizontal machine impregnation method is preferably used so as to substantially avoid any resin rich or resin starved areas and not block any of the open areas. After impregnation is completed, the resulting prepreg may be rolled up on cylinders with polyethylene sheet separators. This material has a shelf life of up to one year if held at about 0° F. and has a working life of at least about 15 days at about 80° and 65% relative humidity.

The prepreg may be cut, shaped to the desired configuration and fully cured by any suitable method and apparatus. For best results, shaping and curing using a vacuum bag assembly and an autoclave is preferred. FIG. 2 shows a schematic vertical section through a simplified vacuum bag assembly which gives excellent results.

A tool surface 30 is prepared having a surface corresponding to the desired outer surface configuration of the face sheet. While a flat tool 30 surface is shown in FIG. 2 for clarity of illustration, the surface may often be a portion of a cylinder, cone or a complex curve. The triaxial weave is much more easily formed to such shapes without severely distorting the size and arrangement of open areas than is a biaxial weave fabric.

A layer of release agent or a release film 32 is applied to the surface of tool 30. Any suitable release material may be used.

Next, a layer of peel ply 34 is applied as a means to remove excess resin from the holes after the resin is cured.

The open, triaxial, weave prepreg 36 is gently placed over the peel ply. Care should be exercised to avoid distorting the weave. If the tool contour is complex, a heat gun and a Teflon squeegee may be used to tack or drape the prepreg to the contour of the tool. The heat gun should not exceed 250° F. and should not be used on any area for longer than about 30 seconds.

Another layer of peel ply 34 as described above is laid over prepreg 36. Then a layer of plastic film 38 as a barrier to keep resin from bleeding through. Over this film is placed a breather sheet 40 to evacuate air and volatiles. While, if desired, the epoxy may be cured in a vacuum pack which only uses a layer of release material between prepreg and tool and between prepreg and vacuum bag, for best results the entire multi-layer pack described above should be used.

A suitable vacuum source 42 is place at one end of the pack and a vacuum probe 44 is place at the opposite end. A vacuum bag 46 is placed over the assembly, with bag seals 48 sealingly engaging tool 30.

The assembly may have a vacuum applied and the assembly may be heated to cure the epoxy resin in a suitable manner. Typically, the assembly is placed in an autoclave (not shown) and a vacuum, to a minimum of about 10 inches of mercury is drawn and the bag is checked for leaks by means of probe 44. A pressure of about 30 to 40 psi is then applied through the autoclave, venting the bag to atmosphere when the autoclave pressure reaches about 15 psi. The assembly is typically heated to about 340° to 360° F. at a heat up rate of about 2° to 8° F. per minute. When the curing temperature is reached, cure is continued for about 60 to 90 minutes. The part is cooled typically to below about 250° F. before pressure is released. Generally, for best results, the assembly is cooled to about 220° F. or lower before releasing pressure. These temperatures and times may be varied depending upon the specific resin system used.

The resulting sheet is a strong, stiff sheet having about 25 to 33% open area, a thickness of about 0.025 to 0.035 inch and a weight per square foot of about 650 to 750 g/m.². The surface of the sheet adjacent to the tool 30 is very smooth and uniform.

FIG. 3 shows a typical acoustic panel 50 in which the face sheet of this invention might be used. The panel includes an imperforate back sheet 52 which may be aluminum, a fiber reinforced resin composite or the like, bonded to a honeycomb body section 54 made of any suitable material and a face sheet 56 of the open, triaxial weave material described above. Face sheet 56 may be bonded to honeycomb 54 by any suitable adhesive film. It is preferred that honeycomb bond section 54 have a thickness of from about $\frac{1}{4}''$ to $1\frac{1}{2}''$ inch and a cell diameter, flat-to-flat, of about $\frac{3}{8}$ to $\frac{1}{2}$ inch. A suitable microporous smooth layer 58, preferably, made of woven stainless steel cloth, is adhesively bonded to the face sheet 56.

Further details of certain preferred methods of making an improved face sheet and acoustic panel are provided in the following examples. Parts and percentages are by weight, unless otherwise indicated.

EXAMPLE I

A sheet about 5 inches by 10 inches of triaxial weave carbon fiber fabric is prepared as described in U.S. Pat. No. 3,446,251 with warp fiber tow at about $-30°$ and $+30°$ and fill fiber tow at about 90° and having about 6,000 fibers in each tow. The fabric is impregnated with a suitable epoxy resin to form a prepreg. A thick aluminum plate having a convex curved surface roughly corresponding to a portion of a conical surface and an area somewhat greater than 5 by 10 inches is provided. A layer of release film is placed on the aluminum plate surface. Over this is placed a peel ply, then the sheet of prepreg. To help the prepreg to conform to the curved surface, a Teflon ® squeegee is used to smooth the fabric into position and a heat gun at about 300° F. is used to help the fabric assume the desired shape. Care is exercised to avoid distorting the triaxial pattern. Over the fabric is laid a second sheet of peel ply, then a $\frac{1}{2}$ mil sheet of film and a layer of breather material. Finally, a nylon vacuum bag having a thickness of about 0.002 inch, is placed over the lay-up. A vacuum source tube is extended to a point adjacent to one edge of the lay-up and a vacuum probe is place adjacent to the opposite edge. A bag seal is placed between the vacuum bag edges and the aluminum plate around the lay-up. The assembly is then loaded into an autoclave. A vacuum of about 10 inches of mercury is applied and the bag is checked for leakage. Once absence of leakage is ascertained, autoclave pressure is raised to about 30 psi, venting the bag to atmosphere through the vacuum tube when pressure reaches about 15 psi. The assembly is heated to about 340° F. at a rate of about 2° F. per minute. The pressure and temperature are maintained for about 90 minutes, after which the assembly is cooled in the autoclave to about 220° F. Pressure is released, the assembly is removed from the autoclave and cooled to room temperature. The face sheet has a resin content of about 26 wt%, a 4% maximum void content, has a thickness of about 0.028 inch and a compression at about 72° F. of about 190 lbs/in width. The open area of the face sheet is about 26%.

EXAMPLE II

A second piece of triaxial fabric is prepared as in Example I, except that the number of fibers in each tow is reduced slightly to 3000. The fabric is uniformly impregnated with an epoxy. An aluminum plate having a surface somewhat larger than said fabric is sprayed with a uniform thin film of release agent. A suitable bleeder sheet of glass bleeder fabric is next placed on the plate. Over this are laid a layer of permeable release film and the layer of prepreg. Over this composit sheet of permeable release film, glass fabric and Tedlar are applied. A vacuum bag assembly as described in Example I is placed over this pack and the entire assembly is placed in an autoclave. A vacuum of about 12 inches of mercury is drawn in the bag, then pressure of about 40 psi is applied to the bag and the autoclave temperature is increased to about 360° F. at a rate of about 8° F. per minute. The epoxy is cured at about 360° F. for about 60 minutes. The autoclave is cooled to about 200° F., then the pack is removed and cooled to room temperature. An excellent high strength face sheet results, with a resin content of about 26 wt% and an open area percentage of about 35%.

EXAMPLE III

An acoustic panel backing plate and core having a 0.010 inch aluminum backing plate bonded to a 1.5 inch thick aluminum flexcore honeycomb from Hexcel Inc. is provided with a concave honeycomb open face corresponding to the configuration of the aluminum plate of Example I. The face sheet prepared as described in Example I is bonded to the open honeycomb face.

In addition to the specific materials and process parameters described in the above examples and the specific arrangements shown in the drawing, other materials, parameters and dimensions may be used, where suitable, within the scope of the claims.

What is claimed is:

1. In the method of making an acoustic panel which comprises the steps of providing an imperforate backing sheet, bonding thereto a honeycomb body structure with the honeycomb cells substantially perpendicular to the backing sheet and bonding to the open face of said honeycomb body a perforated face sheet and bonding a microporous layer to the outer layer of the face sheet, the improvement wherein said face sheet comprises:
   a fabric sheet comprising carbon fiber tows woven in a triaxial pattern with he warp tows at angles of from about −27° to −33° and the fill tows at about 87° to 93° where the 0° axis lies along the length of fabric sheet; and
   a substantially fully cured epoxy resin substantially uniformly impregnated throughout said tows without bridging open areas between tows;
   said sheet having from about 25 to 33% open area.

2. The sheet according to claim 1 wherein said carbon fiber tows have from about 3,000 to 15,0000 carbon fibers in each tow.

3. The sheet according to claim 1 wherein said carbon fibers have a fiber Young's modulus in the range of about 30 to 37×10$^6$ psi.

4. The sheet according to claim 1 wherein warp tows range from about 4.4 to 4.8 per inch and the fill tows range from about 4.6 to 5.

* * * * *